United States Patent
Arimoto et al.

(10) Patent No.: US 11,932,291 B2
(45) Date of Patent: Mar. 19, 2024

(54) TRANSMISSION SYSTEM AND TRANSMISSION METHOD

(71) Applicant: Mitsubishi Electric Corporation, Tokyo (JP)

(72) Inventors: Seigo Arimoto, Tokyo (JP); Yuji Goto, Tokyo (JP); Motonobu Jutori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 722 days.

(21) Appl. No.: 17/045,997

(22) PCT Filed: Apr. 13, 2018

(86) PCT No.: PCT/JP2018/015557
§ 371 (c)(1),
(2) Date: Oct. 8, 2020

(87) PCT Pub. No.: WO2019/198232
PCT Pub. Date: Oct. 17, 2019

(65) Prior Publication Data
US 2021/0171076 A1    Jun. 10, 2021

(51) Int. Cl.
*B61L 15/00* (2006.01)
*H04L 12/40* (2006.01)
*H04L 47/2425* (2022.01)

(52) U.S. Cl.
CPC ....... *B61L 15/0018* (2013.01); *B61L 15/0072* (2013.01); *H04L 12/40013* (2013.01);
(Continued)

(58) Field of Classification Search
CPC .. B61L 15/0018; B61L 15/0072; B61L 15/42; B61L 2200/26; H04L 12/40013;
(Continued)

(56) References Cited

U.S. PATENT DOCUMENTS 6,873,891 B2    3/2005  Moser et al.
7,212,888 B2    5/2007  Jessen
(Continued)

FOREIGN PATENT DOCUMENTS

DE    10025493 A1    12/2001
DE    10232875 A1    1/2004
(Continued)

OTHER PUBLICATIONS

International Search Report (PCT/ISA/210) dated Jul. 3, 2018, by the Japan Patent Office as the International Searching Authority for International Application No. PCT/JP2018/015557.
(Continued)

*Primary Examiner* — Michael J Zanelli
(74) *Attorney, Agent, or Firm* — BUCHANAN INGERSOLL & ROONEY PC

(57) ABSTRACT

A transmission system includes: a hub to receive a control command from two or more controllers that control operation of an in-vehicle machinery installed in a train, and to control an output of the control command on the basis of a priority assigned to the control command, and a system-controller to determine an operating state of a controller that is a source of the control command, the system-controller being capable of changing a priority assigned to a control command transmitted from a controller whose operating state has been determined, on the basis of a determination result.

10 Claims, 4 Drawing Sheets

(52) U.S. Cl.
CPC .... *H04L 12/40163* (2013.01); *H04L 47/2433* (2013.01); *H04L 2012/40293* (2013.01)

(58) Field of Classification Search
CPC ........... H04L 12/40163; H04L 47/2433; H04L 2012/40293
See application file for complete search history.

(56) References Cited

U.S. PATENT DOCUMENTS

| | | | |
|---|---|---|---|
| 2003/0171865 | A1 | 9/2003 | Moser et al. |
| 2004/0014561 | A1 | 1/2004 | Jessen |
| 2015/0019052 | A1 | 1/2015 | Katsuragi et al. |
| 2015/0200712 | A1* | 7/2015 | Cooper ............. H04L 12/40169 375/257 |

FOREIGN PATENT DOCUMENTS

| | | | |
|---|---|---|---|
| DE | 102009006896 | A1 | 8/2010 |
| DE | 102015112755 | A1 | 2/2017 |
| EP | 3499821 | A1 | 6/2019 |
| JP | 2005333724 | A | 12/2005 |
| JP | 2009142083 | A * | 6/2009 |
| WO | 2013108458 | A1 | 7/2013 |
| WO | 2018029756 | A1 | 2/2018 |

OTHER PUBLICATIONS

Written Opinion (PCT/ISA/237) dated Jul. 3, 2018, by the Japan Patent Office as the International Searching Authority for International Application No. PCT/JP2018/015557.

Office Action issued in corresponding Indian Patent Application No. 202027043061, dated Dec. 12, 2022, 4 pages.

Office Action dated Nov. 2, 2023, issued in the corresponding to German Patent Application No. 112018007474.9, 14 pages including 7 pages of English Translation.

* cited by examiner

TRANSMISSION SYSTEM AND TRANSMISSION METHOD

FIELD

The present invention relates to a transmission system to be installed in a train and to a transmission method.

BACKGROUND

Conventionally, an onboard network constructed in a train assigns a priority to information to be transmitted and prioritizes transmission of information assigned with a high priority. Patent Literature 1 discloses a technique in an information transmission system to set in advance a higher priority to control information than the priority assigned to media information to prioritize transmission of the control information over the media information so as to ensure real-time transmission of the control information.

CITATION LIST

Patent Literature

Patent Literature 1: Japanese Patent Application Laid-open No. 2005-333724

SUMMARY

Technical Problem

However, the information transmission system disclosed in Patent Literature 1 does not take into account the operating state of a device that is a source of the information. In a case where an ATO (Automatic Train Operation: driving assistant) is installed in a train, even when the driving assist function is set disabled and a driver is manually driving the train, the ATO still transmits a control command for checking for connection thereof with other devices. The control command for checking for connection is not intended to control operation of a device installed in a vehicle, but is still transmitted as a control command from the ATO with a priority as high as a control command issued when the driving assist function is set enabled. This leads to a problem that there is a possibility that transmission of the control command for checking for connection from the ATO may cause a delay in transmitting a control command from another device which needs to be transmitted in a real-time manner.

The present invention has been achieved to solve the above problems, and an object of the present invention is to provide a transmission system capable of changing a priority assigned to a control command in accordance with an operating state of a device that is a source of the control command.

Solution to Problem

To solve the above problems and achieve the object, a transmission system according to the present invention includes: a transmitter to receive a control command from two or more controllers that control operation of an in-vehicle machinery installed in a train, and to control an output of the control command on a basis of a priority assigned to the control command; and a system-controller to determine an operating state of a controller that is a source of the control command, the system-controller being capable of changing a priority assigned to a control command transmitted from a controller whose operating state has been determined, on a basis of a determination result.

Advantageous Effects of Invention

According to the present invention, there is an effect where it is possible to change a priority assigned to a control command in accordance with an operating state of a device that is a source of the control command.

DESCRIPTION OF EMBODIMENTS

A transmission system and a transmission method according to an embodiment of the present invention will be described in detail below with reference to the accompanying drawings. The present invention is not limited to the embodiment.

Embodiment

Figure 1:
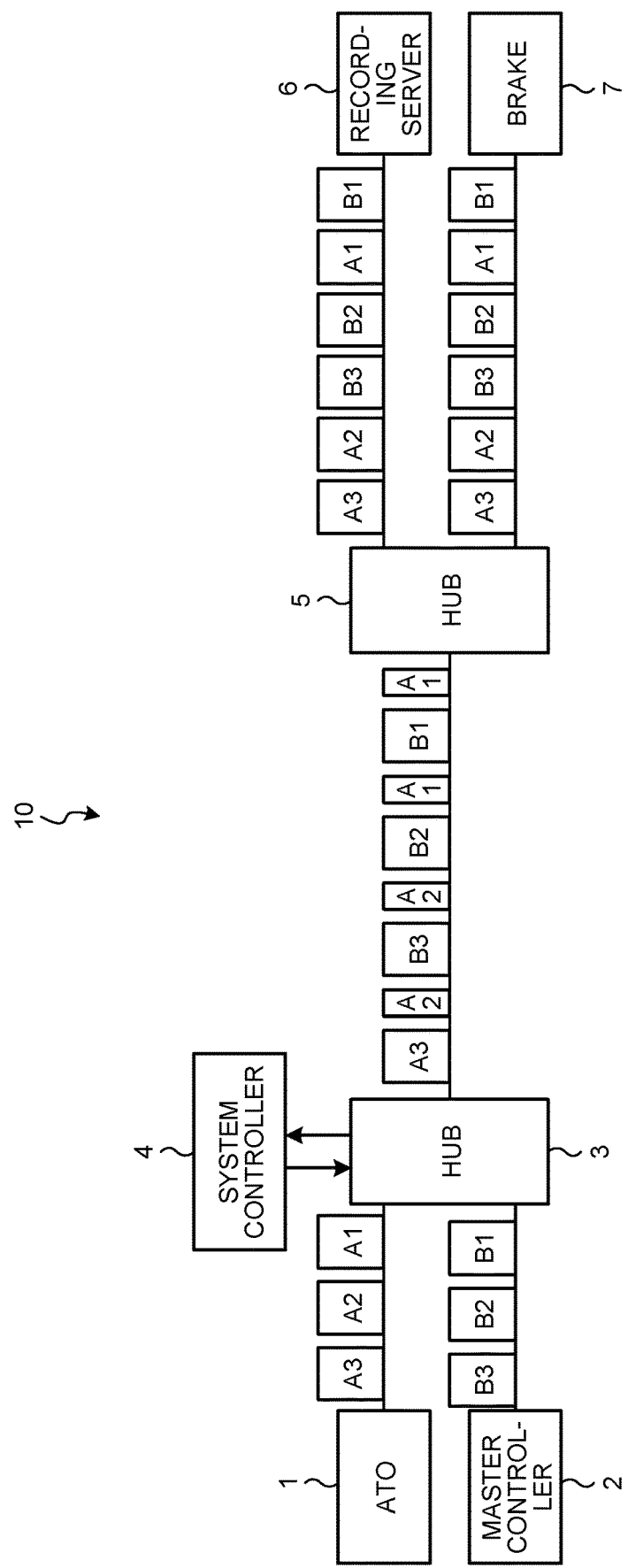
FIG. 1 is a diagram illustrating a configuration example of a transmission system.

FIG. 1 is a diagram illustrating a configuration example of a transmission system 10 according to an embodiment of the present invention. The transmission system 10 is installed in a train (not illustrated). In the transmission system 10, a controller controls operation of an in-vehicle machinery. The transmission system 10 includes an ATO 1, a master controller 2, hubs 3 and 5, a system-controller 4, a recording server 6, and a brake 7.

The brake 7 is an example of the in-vehicle machinery installed in the train. The in-vehicle machinery is not limited to the brake 7 and may be a device whose operation is controlled in accordance with an instruction from at least one of the ATO 1 and the master controller 2. It is allowable that in the transmission system 10, there are a plurality of in-vehicle machineries. The ATO 1 and the master controller 2 are controllers to control operation of the in-vehicle machinery that is the brake 7. The recording server 6 records therein information on a control command to be transmitted in the transmission system 10.

The hubs 3 and 5 are transmitters having a function of transferring a received control command. The hubs 3 and 5 have nearly the same function. However, the hubs 3 and 5 operate in a different manner depending on differences in connection configurations, that is, differences in devices to be respectively connected thereto. When the hub 3 receives a control command from the ATO 1 and the master controller 2, the hub 3 controls the output of the control commands on the basis of a priority assigned to each of the control commands, that is, controls the order of outputting the control commands. While in an example of FIG. 1, there are two controllers connected to the hub 3, this is merely an example. It is allowable that three or more controllers are connected to the hub 3. The hub 5 outputs a control command received from the hub 3 to the recording server 6 and the brake 7. In the example of FIG. 1, there is only one in-vehicle machinery, which is the brake 7, connected to the hub 5, however, this is merely an example. It is allowable that two or more in-vehicle machineries are connected to the hub 5. It is allowable that the hubs 3 and 5 are installed separately in different vehicles or are installed in the same vehicle. In a case where the hubs 3 and 5 are installed separately in different vehicles, as the number of connected vehicles in the train is increased, the number of hubs is increased in the transmission system 10. In the example in FIG. 1, the in-vehicle machinery that is the brake 7 is connected only to the hub 5. However, an in-vehicle machinery may be connected to the hub 3. In a case where the transmission system 10 includes three or more hubs, in-vehicle machineries may be connected respectively to the hubs.

The system-controller 4 determines an operating state of a controller that is a source of the control command. On the basis of the operating state of the controller that is a source of the control command, the system-controller 4 sets a priority to a control command transmitted from the controller, whose operating state has been determined, for the hub 3. That is, the system-controller 4 can change the priority set to a control command transmitted from a controller, whose operating state has been determined, for the hub 3. In the present embodiment, the ATO 1 is defined as a controller for which the system-controller 4 is capable of changing the priority set to a control command. For example, the system-controller 4 is installed in a driver's cab (not illustrated) of the train.

In the Ethernet® network, the transmission system 10 transmits Ethernet packets. In the transmission system 10, the ATO 1 and the master controller 2 transmit an Ethernet packet including control information as a control command, and the hubs 3 and 5 transfer the control command that is the Ethernet packet.

Figure 2:
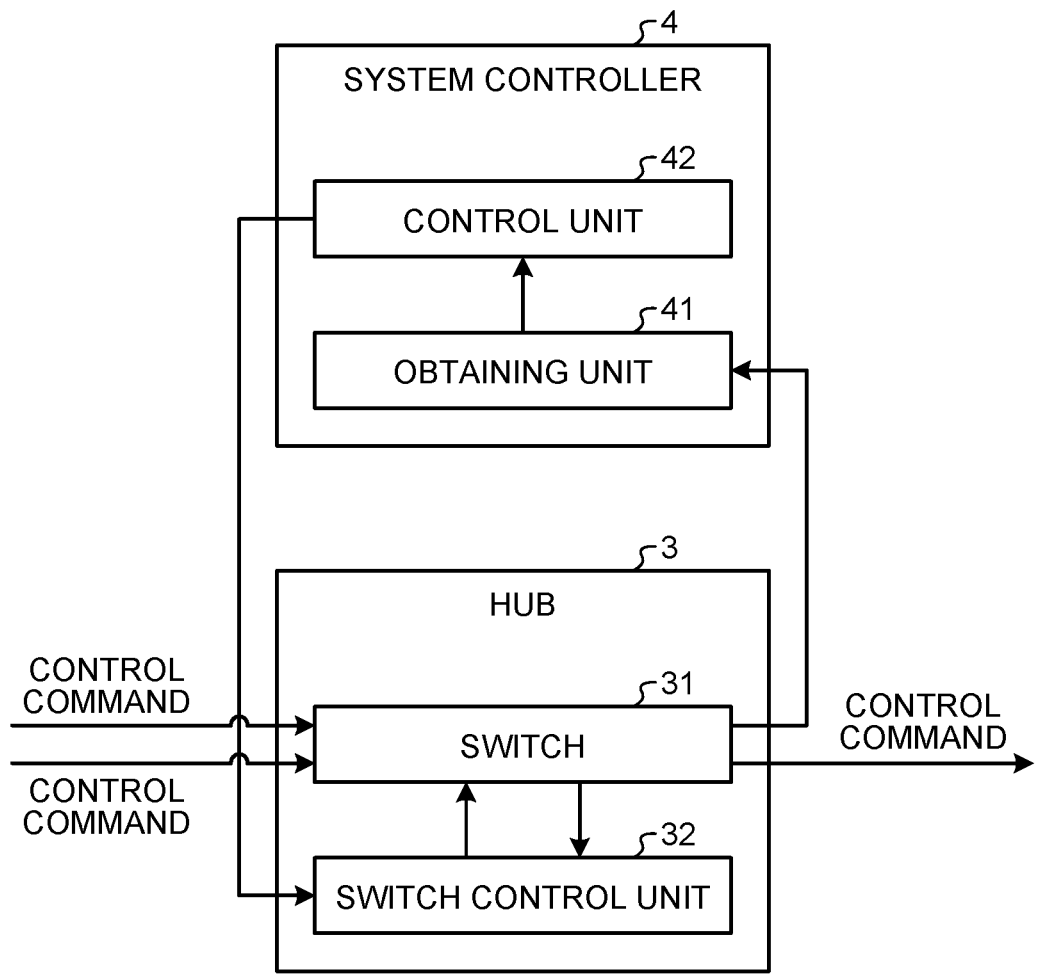
FIG. 2 is a block diagram illustrating a configuration example of a hub and a system-controller.

The configurations of the hub 3 and the system-controller 4 are described below. FIG. 2 is a block diagram illustrating a configuration example of the hub 3 and the system-controller 4 according to the present embodiment. As illustrated in FIG. 2, the hub 3 includes a switch 31 and a switch control unit 32. On the basis of the control by the switch control unit 32, the switch 31 outputs a control command received from the ATO 1 and the master controller 2 on the basis of a set priority. For example, the switch 31 is a layer 2 switch. On the basis of the control by the system-controller 4, the switch control unit 32 sets a priority to a control command for the switch 31.

As illustrated in FIG. 2, the system-controller 4 includes an obtaining unit 41 and a control unit 42. The obtaining unit 41 obtains a control command output from the switch 31 in the hub 3, and outputs the control command to the control unit 42.

Figure 3:
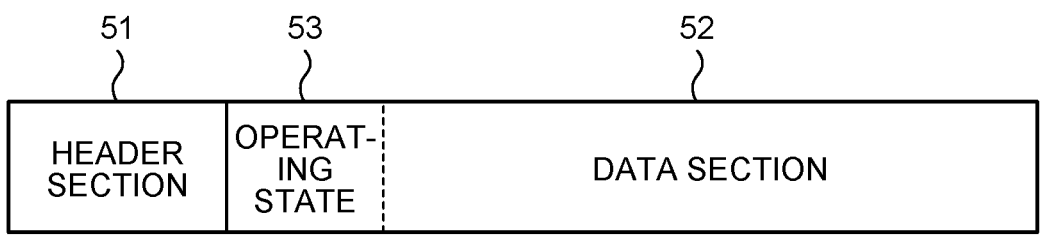
FIG. 3 is a diagram illustrating an example of a format of a control command.

The control unit 42 monitors the control command obtained through the obtaining unit 41 and determines an operating state of the ATO 1. Specifically, the control unit 42 refers to a field indicating the operating state in a data section of the control command transmitted from the ATO 1, that is, an Ethernet packet. The control unit 42 determines an operating state of the ATO 1 on the basis of an information bit in the field indicating the operating state. FIG. 3 is a diagram illustrating an example of the format of a control command according to the present embodiment. In general, in a control command transmitted from the ATO 1, namely in an Ethernet packet, a header section 51 and a data section 52 are included. In the Ethernet packet, the header section 51 includes a tag field in which a priority and the like can be set to the packet. However, during operation of the transmission system 10, the tag information set for each type of the Ethernet packet remains unchanged. In the transmission system 10, a high priority is set in the tag in the header section 51 of a control command transmitted from the ATO 1, and also a high priority is set in the tag in the header section 51 of a control command transmitted from the master controller 2. In contrast, in the field of an operating state 53 in the data section 52, an information bit in the operating state 53 dynamically changes depending on the operating state of the ATO 1.

Operating states of the ATO 1 include a state in which the ATO 1 assists a driver who is driving the train, and a state in which the driving assist function is set disabled because the driver is manually driving the train. The control unit 42 determines which of the operating states the ATO 1 is in on the basis of the information bit described above. When the ATO 1 is in a state of assisting the driver driving the train, the control unit 42 determines that the operating state of the ATO 1 is an assisting state. The control unit 42 assigns a high priority to a control command transmitted from the ATO 1 when the ATO 1 is determined to be in the assisting state. As described above, a control command transmitted from the master controller 2 is also assigned with a high priority. When the ATO 1 is brought into a state in which the driving assist function is set disabled because the driver is manually driving the train, the control unit 42 determines that the operating state of the ATO 1 is a non-assisting state. The control unit 42 assigns a low priority to a control command transmitted from the ATO 1 when the ATO 1 is determined to be in the non-assisting state, relative to the high priority described above. A low-priority control command when the ATO 1 is determined to be in the non-assisting state does not include control information on controlling the in-vehicle machinery, that is, does not include valid control information. A low-priority control command transmitted from the ATO 1 when the ATO 1 is determined to be in the non-assisting state is referred to as "invalid control command". The invalid control command is not intended to control operation of the in-vehicle machinery, but is intended to check for connection, that is, intended to be recorded in the recording server 6. The invalid control command does not need to be transmitted in a real-time manner. Even though the invalid control command is assigned with a low priority, this does not cause any problem. On the basis of the determination result, the control unit 42 instructs the switch control unit 32 in the hub 3 whether to transmit a control command having been transmitted from the ATO 1 with a high priority or a low priority. As described above, in a case where the operating state of the ATO 1 is determined to be the non-assisting state, although tag information in the header section 51 of an invalid control command transmitted from the ATO 1 indicates a high priority, the control unit 42 assigns a low priority to the invalid control command without changing the tag information.

Figure 4:
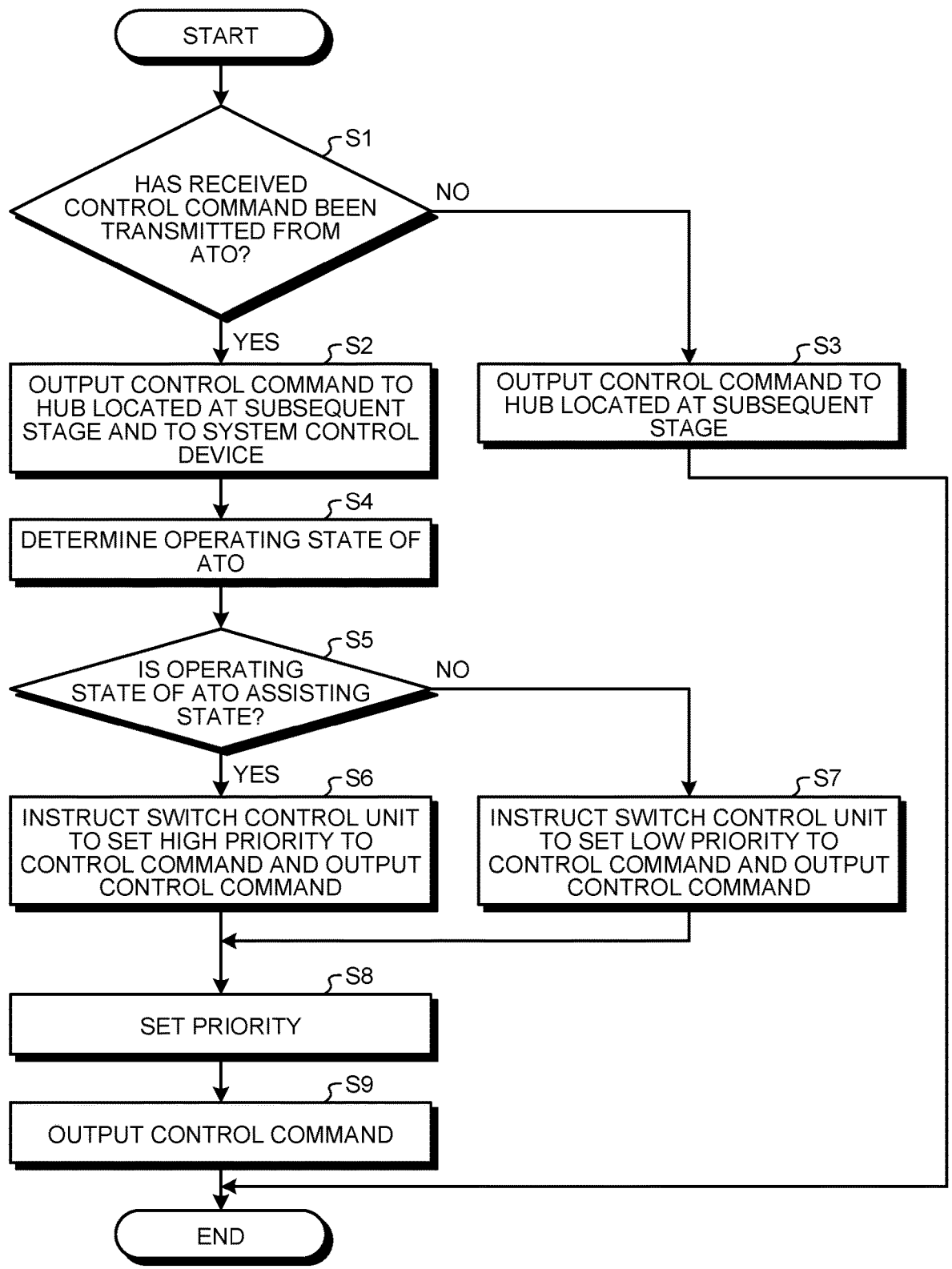
FIG. 4 is a flowchart illustrating operation to transmit a control command in the transmission system.

Next, operation of the hub 3 and the system-controller 4 is described. FIG. 4 is a flowchart illustrating operation to transmit a control command in the transmission system 10 according to the present embodiment. In the transmission system 10, the switch 31 in the hub 3 determines whether a received control command has been transmitted from the ATO 1 (Step S1). For example, the switch 31 refers to a source address of the received control command and determines whether the control command has been transmitted from the ATO 1. The source address is included in the header section 51 of the format of the control command described above. When the control command has been transmitted from the ATO 1 (YES at Step S1), the switch 31 outputs the control command received from the ATO 1 to the hub 5 located at the subsequent stage, as well as to the system-controller 4 (Step S2). When the control command has been transmitted from the master controller 2 (NO at Step S1), the switch 31 outputs the control command received from the master controller 2 to the hub 5 (Step S3). It is allowable that the hub 3 does not determine a source of each control command, but outputs all control commands to the system-controller 4. In this case, the system-controller 4 determines whether a received control command has been transmitted from the ATO 1.

When the control unit 42 in the system-controller 4 obtains a control command through the obtaining unit 41, the control unit 42 determines an operating state of the ATO 1 (Step S4). Specifically, the control unit 42 refers to an information bit of the operating state 53 in the data section 52 of the control command, that is, the Ethernet packet. When the control unit 42 determines that the operating state of the ATO 1 is the assisting state (YES at Step S5), the control unit 42 assigns a high priority to the control command transmitted from the ATO 1. The control unit 42 instructs the switch control unit 32 to set a high priority to the control command transmitted from the ATO 1, and to output this control command (Step S6). When the control unit 42 determines that the operating state of the ATO 1 is the non-assisting state (NO at Step S5), the control unit 42 assigns a low priority to the control command transmitted from the ATO 1. The control unit 42 instructs the switch control unit 32 to set a low priority to the control command transmitted from the ATO 1, and to output this control command (Step S7).

On the basis of the instruction from the control unit 42 at Step S6 or Step S7, the switch control unit 32 in the hub 3 sets a priority to the control command transmitted from the ATO 1 for the switch 31 (Step S8). In accordance with the setting by the switch control unit 32, the switch 31 outputs the control command transmitted from the ATO 1 (Step S9).

At Step S9 subsequent to Steps S7 and S8, when the switch 31 assigns a low priority to a control command transmitted from the ATO 1 in the non-assisting state, that is, an invalid control command, and outputs this control command: when the switch 31 receives a control command from the master controller 2 while outputting the control command of the ATO 1, the switch 31 stops outputting the control command of the ATO 1 so as to output the control command of the master controller 2 prior to the control command of the ATO 1. A control command transmitted from a controller other than the ATO 1, that is, from the master controller 2 in the example in FIG. 1 is assigned with a high priority as described above. As illustrated in FIG. 1, in the hub 3, when the switch 31 receives a control command B1 from the master controller 2 while outputting a control command A1 of the ATO 1 in the non-assisting state, the switch 31 stops outputting the control command A1 of the ATO 1 so as to output the control command B1 of the master controller 2. After having output the control command B1 of the master controller 2, the switch 31 outputs the remaining portion of the control command A1 of the ATO 1 which has not yet been output. While outputting the control command A1 and the control command B1, the switch 31 receives a control command A2 from the ATO 1 in the non-assisting state and receives a control command B2 from the master controller 2. Although the switch 31 receives the control command B2 of the master controller 2 while outputting the remaining portion of the control command A1 of the ATO 1 which has not yet been output, for example, when the number of parts into which a control command is divided is set to "2", or when a portion of the control command A1 of the ATO 1 which has not yet been output is equal to or less than the minimum limit of output at the point in time when the switch 31 receives the control command B2 of the master controller 2, then the switch 31 continues to output the remaining portion of the control command A1 of the ATO 1 which has not yet been output. Next, the switch 31 outputs the control command B2 of the master controller 2, and thereafter outputs the control command A2 of the ATO 1. In the same manner as described above, when the switch 31 receives a control command B3 from the master controller 2 while outputting the control command A2 of the ATO 1, the switch 31 also stops outputting the control command A2 of the ATO 1 so as to output the control command B3 of the master controller 2. After having output the control command B3 of the master controller 2, the switch 31 outputs the remaining portion of the control command A2 of the ATO 1 which has not yet been output. The switch 31 receives the control command A3 from the ATO 1 in the non-assisting state, and outputs the control command A3 of the ATO 1. When the switch 31 assigns a high priority to a control command transmitted from the ATO 1 in the assisting state and outputs the control command at Step S9 subsequent to Steps S6 and S8, the switch 31 outputs the control command in the order of receiving this control command. In the example in FIG. 1, since the switch 31 receives the control command A1, the control command B1, the control command A2, the control command B2, the control command A3, and the control command B3 in the order described, the switch 31 outputs the control command A1, the control command B1, the control command A2, the control command B2, the control command A3, and the control command B3 in the same order as the order of receiving these control commands.

When the hub 5 receives each divided part of a control command from the hub 3, the hub 5 restores the divided parts of the control command into a single control command and outputs the restored single control command. At this time, the hub 5 prioritizes the output of an undivided control command over the divided control command. As illustrated in FIG. 1, when the hub 5 receives a portion of the control command A1, the control command B1, the remaining portion of the control command A1, the control command B2, a portion of the control command A2, the control command B3, the remaining portion of the control command A2, and the control command A3 in the order described: then the hub 5 outputs the control command B1, the control command A1, the control command B2, the control command B3, the control command A2, and the control command A3 to the recording server 6 and the brake 7 in the order described.

A case is assumed in which when the operating state of the ATO 1 is determined to be the non-assisting state, the priority assigned to an invalid control command is not changed from a high priority to a low priority. In this case, when the hub 3 receives the control command A1, the control command B1, the control command A2, the control command B2, the control command A3, and the control command B3 in the order described, the hub 3 outputs the control command A1, the control command B1, the control command A2, the control command B2, the control command A3, and the control command B3 to the hub 5 in the same order as the order of receiving these control commands. In the same manner as the hub 3, the hub 5 outputs the control command A1, the control command B1, the control command A2, the control command B2, the control command A3, and the control command B3 to the recording server 6 and the brake 7 in the order described. The order of outputting the control commands B1 to B3 of the master controller 2 is compared between a case where the priority assigned to an invalid control command is changed and a case where the priority assigned to an invalid control command is not changed. The comparison shows that in the case where the priority assigned to an invalid control command is changed, the hub 5 can advance the outputting order of the control command B1 by one, advance the outputting order of the control command B2 by one, and advance the outputting order of the control command B3 by two. That is, in the transmission system 10, when the operating state of the ATO 1 is determined to be the non-assisting state, the priority assigned to an invalid control command is changed to a low priority, so that the transmission system 10 can prioritize transmission of a control command having been transmitted from a controller other than the ATO 1, and can improve real-time transmission.

When the operating state of the ATO 1 is determined to be the non-assisting state, the system-controller 4 does not execute an invalid control command-based control on the brake 7. Accordingly, even though the brake 7 does not receive an invalid control command when the operating state of the ATO 1 is determined to be the non-assisting state, this does not cause any problem. For this reason, it is allowable that the system-controller 4 instructs the hubs 3 and 5 to stop outputting an invalid control command to the in-vehicle machinery that is the brake 7. In the system-controller 4, when the control unit 42 determines that the operating state of the ATO 1 is the non-assisting state, the control unit 42 instructs the switch control unit 32 to set a low priority to a control command transmitted from the ATO 1 and output this control command, and to stop outputting an invalid control command to the in-vehicle machinery. The switch control unit 32 instructs the switch 31 to set a low priority to a control command transmitted from the ATO 1 and output this control command, and also instructs the switch 31 to generate an output control packet that instructs the hub 5 to stop outputting an invalid control command to the in-vehicle machinery, and to output this output control packet to the hub 5. The switch 31 in the hub 3 outputs the output control packet to the hub 5 through the same path as used for outputting a control command. When the hub 5 receives the output control packet from the hub 3, the hub 5 does not output an invalid control command that is received after the hub 5 has received the output control packet, that is, does not output a control command transmitted from the source, that is the ATO 1, to the brake 7. On the basis of the instruction to stop outputting the invalid control command, when the destination of the invalid control command is the recording server 6 or another hub, then the hubs 3 and 5 output the invalid control command. When the destination of the invalid control command is the in-vehicle machinery, the hubs 3 and 5 do not output the invalid control command. Due to this operation, the transmission system 10 can reduce an unnecessary processing load to be imposed by receiving the invalid control command at the brake 7.

Next, a hardware configuration of the system-controller 4 is described. In the system-controller 4, the obtaining unit 41 is implemented by a communication interface circuit. The control unit 42 is implemented by a processing circuitry. The processing circuitry may be a memory and a processor that executes programs stored in the memory, or may be a dedicated hardware.

Figure 5:
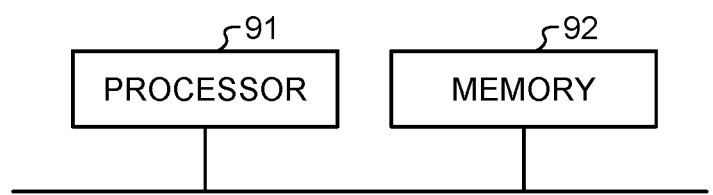
FIG. 5 is a diagram illustrating an example in a case where a processing circuitry included in the system-controller is configured by a processor and a memory.

FIG. 5 is a diagram illustrating an example in a case where the processing circuitry included in the system-controller 4 according to the present embodiment is configured by a processor and a memory. In a case where the processing circuitry is configured by a processor 91 and a memory 92, the functions of the processing circuitry of the system-controller 4 are implemented in software, firmware, or a combination of the software and the firmware. The software or firmware is written as a program and stored in the memory 92. In the processing circuitry, the processor 91 reads and executes the program stored in the memory 92 to thereby implement each of the functions. That is, the processing circuitry includes the memory 92 that stores therein programs that eventually execute operation of the system-controller 4. These programs are also regarded as causing a computer to execute the procedure and the method of the system-controller 4.

The processor 91 may be a device such as a CPU (Central Processing Unit), a processing device, an arithmetic device, a microprocessor, a microcomputer, and a DSP (Digital Signal Processor). For example, a nonvolatile or volatile semiconductor memory such as a RAM (Random Access Memory), a ROM (Read Only Memory), a flash memory, an EPROM (Erasable Programmable ROM), and an EEPROM® (Electrically EPROM), a magnetic disk, a flexible disk, an optical disk, a compact disk, a MiniDisk, or a DVD (Digital Versatile Disk) correspond to the memory 92.

Figure 6:
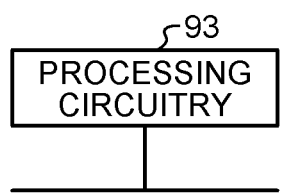
FIG. 6 is a diagram illustrating an example in a case where the processing circuitry included in the system-controller is configured by dedicated hardware.

FIG. 6 is a diagram illustrating an example in a case where the processing circuitry included in the system-controller 4 according to the present embodiment is configured by dedicated hardware. When the processing circuitry is configured by dedicated hardware, then for example, a single circuit, a combined circuit, a programmed processor, a parallel-programmed processor, an ASIC (Application Specific Integrated Circuit), an FPGA (Field Programmable Gate Array), or a combination thereof correspond to a processing circuitry 93 illustrated in FIG. 6. The functions of the system-controller 4 may be implemented by each individual processing circuitry 93 or may be collectively implemented by a single processing circuitry 93.

As for each of the functions of the system-controller 4, it is possible to configure that some parts of the functions are implemented by dedicated hardware and other parts thereof are implemented by software or firmware. In this manner, the processing circuitry can implement each function described above by dedicated hardware, software, firmware, or a combination of these elements.

A hardware configuration of the hub 3 is now described. In the hub 3, the switch 31 is a layer 2 switch as described above. The switch control unit 32 is implemented by the processing circuitry. The processing circuitry of the hub 3 is configured identically to the processing circuitry of the system-controller 4 as illustrated in FIG. 5 or FIG. 6.

As explained above, in the transmission system 10 according to the present embodiment, the system-controller 4 determines an operating state of the ATO 1 on the basis of the operating state 53 included in the data section 52 of a control command transmitted from the ATO 1: and when the operating state of the ATO 1 is determined to be the non-assisting state in which a driver is manually driving the train, the system-controller 4 sets a low priority to the control command transmitted from the ATO 1 for the hub 3. Due to this operation, when the operating state of the ATO 1 is determined to be the non-assisting state, the hub 5 can transmit the control command received from the ATO 1 with a low priority and can transmit a control command received from the master controller 2 with a high priority. As described above, in the transmission system 10, during operation of the train, the system-controller 4 can dynamically change the priority set to a control signal transmitted from the ATO 1 on the basis of the operating state of the ATO 1.

The configurations described in the above embodiment are only examples of the content of the present invention. The configurations can be combined with other well-known techniques, and a part of each configuration can be omitted or modified without departing from the scope of the present invention.

REFERENCE SIGNS LIST

1 ATO, 2 master controller, 3, 5 hub, 4 system-controller, 6 recording server, 7 brake, 10 transmission system, 31 switch, 32 switch control unit, obtaining unit, 42 control unit.

The invention claimed is:

1. A transmission system comprising:
a transmitter to receive a control command from two or more controllers that control operation of an in-vehicle machinery installed in a train, and to control an output of the control command on a basis of a priority assigned to the control command; and
a system-controller to determine an operating state of a controller, of the two or more controllers, that is a source of the control command, the system-controller configured to change the priority assigned to the control command that is to be output by the transmitter, on a basis of a determination result, wherein
a driving assistant is defined as a controller in which a priority assigned to the control command of the controller can be changed.

2. The transmission system according to claim 1, wherein the system-controller refers to a field indicating an operating state in a data section of a packet of a control command transmitted from the driving assistant, and determines an operating state of the driving assistant,
when an operating state of the driving assistant is determined to be an assisting state of assisting a driver driving the train, the system-controller assigns a high priority to a control command transmitted from the driving assistant, and
when an operating state of the driving assistant is determined to be a non-assisting state in which a driving assist function is set disabled because a driver is manually driving the train, the system-controller defines a control command transmitted from the driving assistant as an invalid control command, and assigns the invalid control command with a low priority relative to the high priority.

3. The transmission system according to claim 2, comprising a recording server to record therein information on the control command to be transmitted in the transmission system, wherein
the system-controller instructs the transmitter to stop outputting the invalid control command to the in-vehicle machinery, and
on a basis of an instruction to stop outputting the invalid control command, when a destination of the invalid control command is the recording server or another transmitter, the transmitter outputs the invalid control command, and when a destination of the invalid control command is the in-vehicle machinery, the transmitter does not output the invalid control command.

4. The transmission system according to claim 3, wherein a control command transmitted from a controller other than the driving assistant is assigned with a high priority, and
when the transmitter obtains a control command assigned with a high priority while outputting the invalid control command, the transmitter stops outputting the invalid control command so as to output the control command assigned with a high priority, and after having output the control command assigned with a high priority, outputs a remaining portion of the invalid control command which has not yet been output.

5. The transmission system according to claim 2, wherein a control command transmitted from a controller other than the driving assistant is assigned with a high priority, and
when the transmitter obtains a control command assigned with a high priority while outputting the invalid control command, the transmitter stops outputting the invalid control command so as to output the control command assigned with a high priority, and after having output the control command assigned with a high priority, outputs a remaining portion of the invalid control command which has not yet been output.

6. A transmission method comprising:
receiving a control command by a transmitter from two or more controllers that control operation of an in-vehicle machinery installed in a train;
determining an operating state of a controller, of the two or more controllers, that is a source of the control command by a system-controller, where the system-controller is configured to change a priority assigned to a control command transmitted from the controller whose operating state has been determined, on a basis of a determination result; and
controlling an output of the control command by the transmitter on a basis of the priority assigned to the control command, wherein
a driving assistant is defined as a controller in which the priority assigned to the control command of the controller can be changed.

7. The transmission method according to claim 6, wherein for determining the operating state of the controller,
the system-controller refers to a field indicating an operating state in a data section of a packet of a control command transmitted from the driving assistant, and determines an operating state of the driving assistant,
when an operating state of the driving assistant is determined to be an assisting state of assisting a driver driving the train, the system-controller assigns a high priority to a control command transmitted from the driving assistant, and
when an operating state of the driving assistant is determined to be a non-assisting state in which a driving assist function is set disabled because a driver is manually driving the train, the system-controller defines a control command transmitted from the driving assistant as an invalid control command, and assigns the invalid control command with a low priority relative to the high priority.

8. The transmission method according to claim 7, wherein for determining the operating state of the controller, the system-controller instructs the transmitter to stop outputting the invalid control command to the in-vehicle machinery, and for controlling the output of the control command by the transmitter, on a basis of an instruction to stop outputting the invalid control command, when a destination of the invalid control command is a recording server to record therein information on a control command to be transmitted, or is another transmitter, the transmitter outputs the invalid control command, and when a destination of the invalid control command is the in-vehicle machinery, the transmitter does not output the invalid control command.

9. The transmission method according to claim 8, wherein a control command transmitted from a controller other than the driving assistant is assigned with a high priority, and for controlling the output of the control command by the transmitter, when the transmitter obtains a control command assigned with a high priority while outputting the invalid control command, the transmitter stops outputting the invalid control command so as to output the control command assigned with a high priority, and after having output the control command assigned with a high priority, outputs a remaining portion of the invalid control command which has not yet been output.

10. The transmission method according to claim 7, wherein a control command transmitted from a controller other than the driving assistant is assigned with a high priority, and for controlling the output of the control command by the transmitter, when the transmitter obtains a control command assigned with a high priority while outputting the invalid control command, the transmitter stops outputting the invalid control command so as to output the control command assigned with a high priority, and after having output the control command assigned with a high priority, outputs a remaining portion of the invalid control command which has not yet been output.

* * * * *